Oct. 30, 1956

B. H. KRYZER ET AL 2,768,950

CONTROLS FOR WATER SOFTENERS

Filed Aug. 1, 1952

INVENTORS
BENJAMIN H. KRYZER
LYNN G. LINDSAY
BY John E. Strylen
ATTORNEY

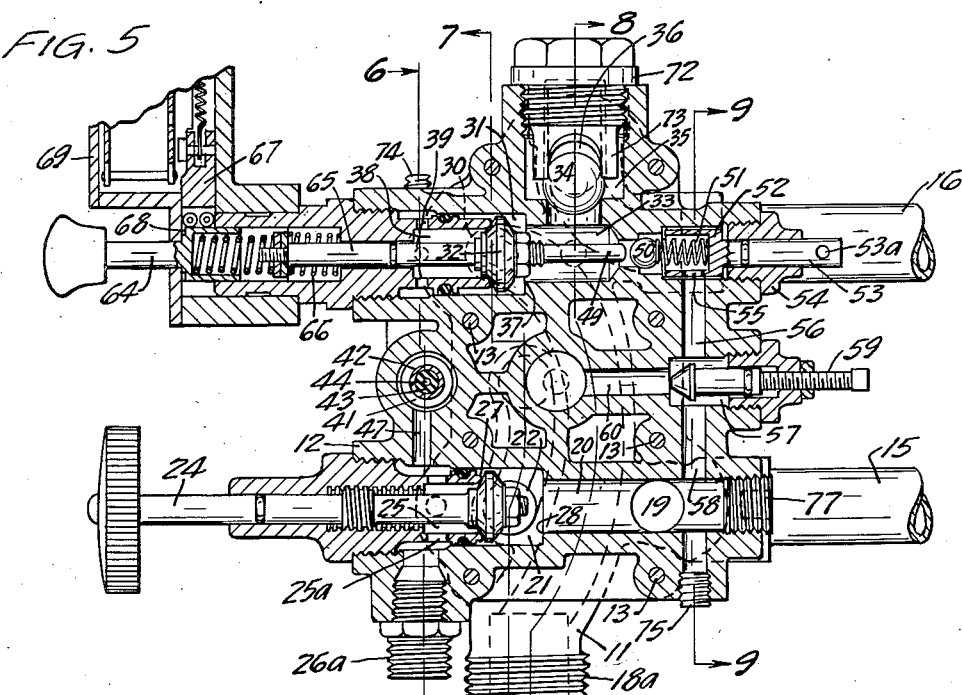

Oct. 30, 1956 B. H. KRYZER ET AL 2,768,950
CONTROLS FOR WATER SOFTENERS
Filed Aug. 1, 1952 3 Sheets-Sheet 3
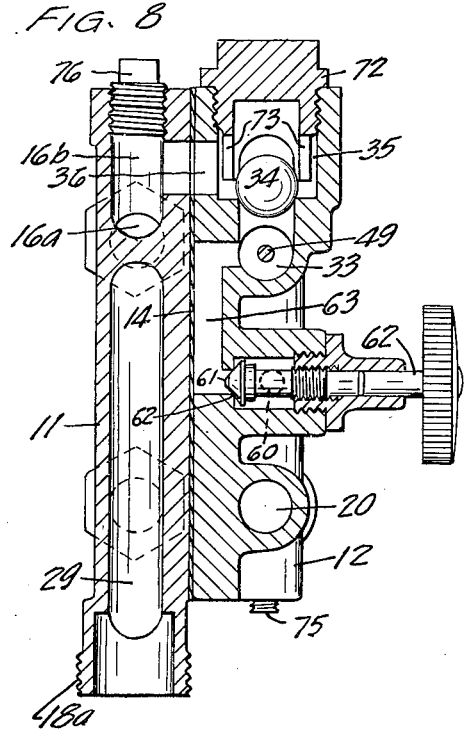
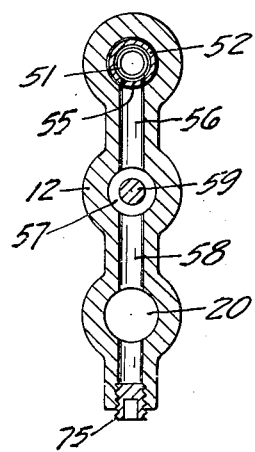
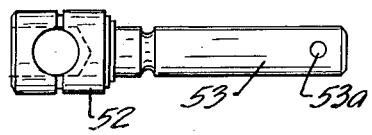
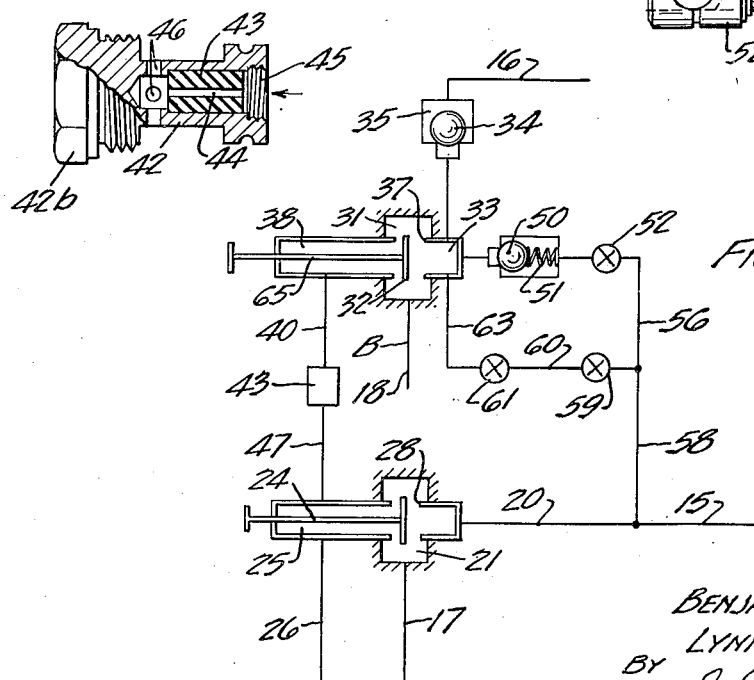
INVENTORS
BENJAMIN H. KRYZER
LYNN G. LINDSAY
BY John E. Hughes
ATTORNEY United States Patent Office 2,768,950
Patented Oct. 30, 1956

2,768,950

CONTROLS FOR WATER SOFTENERS

Benjamin H. Kryzer and Lynn G. Lindsay, St. Paul, Minn., assignors to The Lindsay Company, St. Paul, Minn., a corporation of Minnesota Application August 1, 1952, Serial No. 302,148

1 Claim. (Cl. 210—24)

This invention relates to improvements in controls for domestic water softeners of the base exchange type and has for one of its objects to facilitate efficient operation of such softeners by unskilled users.

Another object is to provide a control of this type which may be readily adjusted and set when installed to compensate for various water pressures and for various amounts and kinds of hardening salts in the water to be softened.

A further object is to provide in a control of the class described means for supplying hard water to the service pipes automatically during regeneration of the softener, where this is desirable, and for cutting off the hard water from the service pipes in other installations where it is best to exclude hard water from the service lines.

Another object is to provide a permanently set backwash rate of flow control combined with manual controls which are readily operable by unskilled domestic users to backwash the softening material without damage or loss of material.

A further and particular object of our invention is to provide a complete set of inexpensive controls, including a semi-automatic regeneration valve mechanism and time control and backwash and salting valve mechanisms and flow rate controls, carried by a single compact casing which is easy to install and from which the several valve mechanisms and controls may be readily removed for repair or replacement, all of the interconnecting passages being formed in the casing and the latter having ports adapted to be connected respectively to a water supply pipe, a service pipe, a drain pipe, and to the upper and lower portions of the water softener tank.

Our invention also includes certain other novel features of construction which will be more fully pointed out in the following specification and claim.

Referring to the accompanying drawings, which illustrate by way of example and not for the purpose of limitation, a preferred embodiment of our invention:

Fig. 5 is a vertical sectional view taken approximately on the line 5—5 of Fig. 3;

Figure 1:
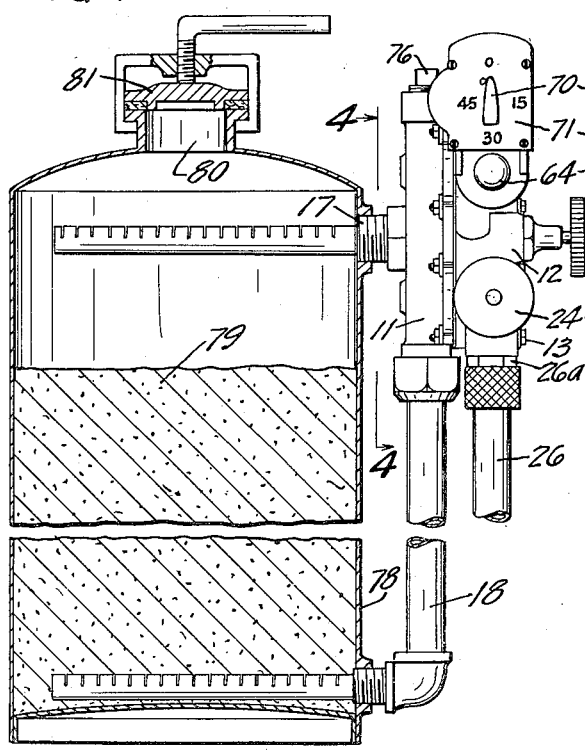
Figure 1 is a front elevational view of our improved control mechanism connected to water softening apparatus, the latter being shown diagrammatically and in vertical section.

Figs. 6, 7, 8 and 9 are sectional views taken approximately on the lines 6—6, 7—7, 8—8 and 9—9, respectively, of Fig. 5;

Fig. 10 is a detail sectional view taken axially through the automatic flow regulator;

Fig. 11 is a detailed view showing the manually operable valve for controlling flow through the hard water by-pass; and Fig. 12 is a diagram illustrating the various passages, chambers and valves formed in and carried by our two-part main casing.

In the drawings, the numerals 11 and 12 indicate the rear and front members respectively of our control casing. Each of these members is formed with passages for fluid, as hereinafter more fully described, and the front member 12 is separable from the rear member 11, being connected thereto by bolts 13 which retain a gasket 14 under compression to seal the joint. The members 11 and 12 may be molded or cast as separate units from suitable materials, e. g., brass for the member 11 and a suitable plastic for the member 12. External ports are formed in the member 11 to be connected to supporting pipes 15, 16, 17 and 18, the threaded portions forming the ports being indicated at 15a, 16a, 17a and 18a respectively. As illustrated, the pipe 15 may be supplied with the water to be softened, under pressure, the pipe 16 is adapted to supply the service outlets with soft water, the pipe 17 may be connected to the upper portion of the water softener tank and the pipe 18 to the lower portion thereof.

The front casing member 12 is supported entirely on the back casing member 11 and may be readily separated therefrom to gain access to the several passages for fluid and several valve mechanisms carried by the front casing member 12. Water supplied from the pipe 15 is conducted through a passage in the casing member 11 to a port 19 (Fig. 5) formed in the casing member 12 and from the port 19 through a passage 20 extending to a valve chamber 21. This chamber is open to a port 22 communicating with an arcuate passage 23 in the member 11 extending to the threaded portion 17a and thence through pipe 17 to the upper portion of the softener tank.

Under control of a manually operable valve indicated generally by the numeral 24, the port 22 may be placed in communication with a valve chamber 25 and drain or waste outlet 26 having a threaded fitting 26a. The valve 24 may be closed either at a seat 27, as shown in Fig. 5, or at a seat 28 formed in the casing member 12. When closed at its seat 28, the valve 24 places the upper portion of the tank in communication with the drain outlet through the passage 23, port 22, chamber 21, chamber 25, passage 25a and fitting 26a.

From the port formed by the threaded portion 18a, an arcuate passage 29 extends upward in the casing member 11 to a port 30 communicating with a valve chamber 31 in the casing member 12. The flow to and from the port 30 is under control of a plunger valve 32 which, when in the position shown in Fig. 5, causes the chamber 31 to be placed in communication with a chamber 33, the latter being open to a passage extending upward to a check valve ball 34. As best shown in Fig. 8, a chamber 35 containing the check valve ball 34 is in communication with a passage 36 formed in the casing member 11 and extending to the port formed by threaded portion 16a and service pipe 16.

During regeneration the valve 32 is closed at its seat 37 thereby placing a valve chamber 38 in communication with the port 30. As best shown in Fig. 6, passages 39 connect a chamber 38 to an annular passage communicating with a passage 40 extending downward to a flow control device contained in a chamber 41 in the casing member 12. As best shown in Fig. 10, this device has a cylindrical member 42 containing a compressible and flexible member 43 which is formed with an axial passage 44 communicating at one end with a central opening in a confining nut 45 and at the other end with radial passages 46 opening into the chamber 41. From the latter, a passage 47 (Fig. 6) extends to the valve chamber 25, the latter being open to the drain port fitting 26a. Chamber 41 is separated from the passage 40 by a resilient sealing ring 48 carried in an annular groove in the cylindrical member 42. This member has a threaded end portion 42a fitting in a threaded bore in the casing member 12 and a head 42b which is accessible from the exterior of the casing member to permit the removal of the flow control device as a unit. Pressure of the liquid on the end surface of the member 43 adjacent to the nut 45 causes longitudinal compression of the member 43 and results in restriction of the passage 44 proportional to the pressure. The member 43 is preferably constructed from a rubber, either natural or synthetic, of suitably soft, compressible composition.

Projecting axially from the valve member 32 is a rigid pin 49 for actuating a check valve ball 50 to open position in relation to its seat when the valve 32 is in regenerating position. The ball 50 is biased toward its seat by a spring 51 confined in a cylindrical valve member 52 having a stem 53 projecting to the exterior of the casing member 12 through a suitable bonnet 54. An opening 55 in the valve member 52 is adapted to be placed in registry with a passage 56 extending downward to a valve chamber 57, the latter being in communication with a passage 58 communicating with the passage 20 and port 19. Thus during regeneration when the ball 50 is held off its seat by the pin 49 hard water may be bypassed through the opening 55 in the valve member 52 to the chamber 33, past the ball 34, through chamber 35 and passage 36 to the service pipe 16. By rotating the stem 53 the member 52 may be turned so that the opening 55 is out of alignment with the passage 56 to thereby cut off the supply of hard water to the service pipe during regeneration.

Provision is made for backwashing the water softening material in the tank and the rate of flow during backwashing is under control of a needle valve 59 operating in the chamber 57 to restrict flow therefrom to a passage 60. During backwashing, hard water is supplied through the pipe 15 and is conducted through the port 19 and passage 58 to the chamber of valve 59, thence through the passage 60 to a valve 61. This valve, when in open position in relation to its seat 62, permits flow to and through a passage 63 (Figs. 7 and 8) extending to the valve chamber 33. Since the valve 32 is normally open in relation to its seat 37 flow is thus established to the bottom of the tank through port 30, passage 29 and pipe 18. From the top of the tank the backwash water passes through pipe 17, passage 23, port 22 to chamber 21. Valve 24, being in closed relation to its seat 28, allows flow to drain through chamber 25, fitting 26a and drain conduit 26.

Semi-automatic control for the duration of the regeneration period is provided. Suitable valve control mechanism for this purpose is described and claimed in Patent No. 2,551,445, granted May 1, 1951, to Lynn G. Lindsay et al. Such mechanism may comprise a plunger 64 operatively connected to a stem 65 for actuating the valve 32 to close at its seat 37 and a spring 66 arranged to bias the valve 32 to closed position against its other seat, and latch mechanism indicated generally by the numeral 67 arranged to engage a shoulder 68 formed on the plunger 64 to temporarily retain the valve 32 in closed relation to its seat 37 against the bias of spring 66. Time control mechanism contained in a housing 69 is operatively connected to the latch 67 to cause the latter to be withdrawn from engagement with the shoulder 68 at the end of a predetermined period for regeneration and flushing of water softening material. The time control 69 is of the spring operated or clock type having a manually operable knob and indicator hand 70 adapted to be manipulated to wind the clock mechanism and, by reference to a dial 71, selectively to indicate and control the period of time for regeneration and flushing. Since details of the time control mechanism are not claimed herein, further detailed description thereof is unnecessary.

Figure 2:
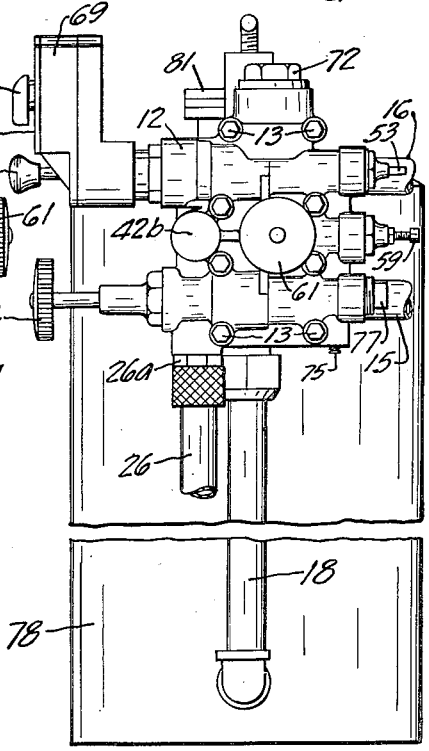
Fig. 2 is an outer side elevational view of the control mechanism, together with a fragmentary portion of the water softening tank.
Figure 4:
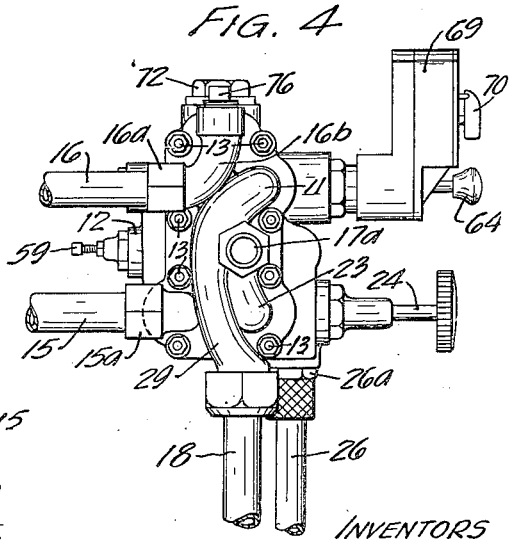
Fig. 4 is an inner side elevational view of the control mechanism separate from the tank.

At the top of the casing member 12 access to the check valve ball 34 is afforded by providing a threaded plug 72 having integral guide members 73 for the ball 34. The vertical passage 40 (Fig. 6) extends to the upper face of the casing member 12 and is closed by a removable threaded plug 74. In a similar manner the vertically aligned passages 58 and 56 are extended to the lower face of the casing and are closed by a threaded plug 75. As best shown in Figs. 4 and 8, the passage 16b extending to the service pipe 16 is extended upward to provide a top outlet which is closed by a threaded plug 76. This threaded opening may be used for a connection with a pressure relief valve. As shown in Figs. 2 and 5, access to the horizontal passage 20 is afforded by providing a removable threaded plug 77 at the end thereof opposite the valve 24.

Figure 3:
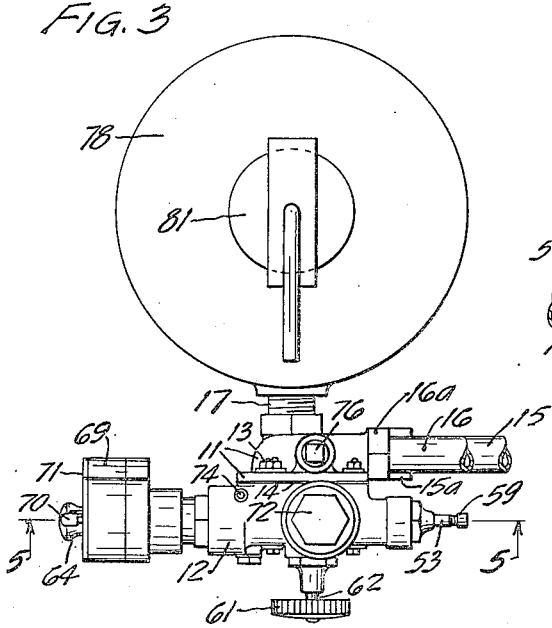
Fig. 3 is a top plan view of the control mechanism and tank.

In Figs. 1, 2 and 3 the numeral 78 indicates a tank containing water softening material 79 and this tank is provided with strainer tubes for the flow to and from the pipes 17 and 18. A top opening 80 and a removable closure 81 are provided so that salt for regenerating the material 79 may be introduced into the top of the tank through the opening 80.

*Operation*

During normal water softening operation, the valves 24 and 32 are in the positions indicated in Fig. 5 so that hard water from the supply pipe 15 passes into the upper portion of the tank 78 through the passages 19, 20, chamber 21 and passages 22 and 23. Soft water from the bottom of the tank is conducted through the pipe 18, passages 29 and 30, chambers 31 and 33 and past check valve 34 to the service pipe 16. The valve 50 is held in closed position by the spring 51 and the valve 61 is closed.

It is usually desirable to backwash the bed of water softening material 79 after a period of use. To backwash, the valve 24 is closed at its seat 28, the valve 32 remains in its water softening position and the valve 61 is manually opened. The rate of backwash flow is determined by the needle valve 59 which is set in a partially open position and this position is determined at the time of installation in accord with the available water pressure, size of the tank and other technical requirements of the particular installation. During backwashing, water from the pipe 15 is conducted through passage 58, chamber 57, passage 60, valve 62, passage 63, chambers 33 and 31, passages 30 and 29 and pipe 18 to the lower portion of the tank 78. The wash water then rises through the bed of material 79, loosening it, and carries the free impurities out through pipe 17, passages 23 and 22 and chambers 21 and 25 to the drain pipe 26. The operator merely allows the valve 61 to remain open for the period of time required for backwashing and then closes this valve, the rate of flow being permanently set by previous adjustment of the needle valve 59. Thus the unskilled operator is not required to make an accurate estimate of the proper opening of the valve 61 in order to avoid too rapid flow through the zeolite bed which might result in loss of zerolite granules through the tank outlet.

For best results, the backwashing should be followed by salting and regeneration of the zeolite bed. In preparation for placing a charge of salt in the tank 78, the valve 24 is closed at its seat 28 to thereby cut off the supply of hard water from the valve chamber 21 and place the pipe 17 extending to the upper portion of the tank in communication with the drain pipe 26 through the chamber 25. This allows enough water to drain from the tank to admit the salt charge. During this lowering of the level of water in the tank, the check valve 34 operates to prevent replacement of the water in the tank by flow from the system of service pipes or from the water heater which in many installations is supplied with cold water flowing through the service pipe 16. The check valve ball returns to its seat by gravity when the pressure in the tank and control passages is reduced below that in the service pipe. The top closure 81 is then removed from the tank, the required amount of salt is charged in through the opening 80 and the closure is replaced and secured in sealing relation to the tank. Upon the closing of the top opening, the valve 24 is actuated to close direct communication between the chambers 21 and 25.

Regeneration of the softener may then be initiated by suitable manipulation of the plunger 64 and time control hand 70. The hand 70 of the time control is turned clockwise until it points to the period in minutes required for regeneration. This winds the clock mechanism and starts the period of regeneration. Finally, the operator merely pushes on the plunger to close the valve 32 at its seat 37 in which position it is held during regeneration by the latch member 67 which engages the shoulder 68 on the plunger. The spring 66 is thereby held under compression and the spring 66a is also slightly compressed to hold the valve 32 firmly on its seat 37. During this period hard water flows to the upper portion of the tank from the supply pipe 15 through the passages 19 and 20, chamber 21 and pipe 17. Water so supplied dissolves the salt in the upper portion of the tank and the resulting brine is carried down through the bed 49 where it reacts by base exchange to remove the hardening impurities from the zeolites. The spent brine and impurities pass out through the pipe 18, chambers 31 and 38, passage 40, flow regulating device 43, chamber 41, passage 47 and chamber 25 to drain pipe 26. As hereinbefore pointed out, the pressure of the liquid in the passage 40 tends to compress the cylindrical member 43 longitudinally and to restrict the passage 44 therein progressively and approximately proportionally to the water pressure so that a substantially uniform rate of flow to waste during regeneration is obtained irrespective of the fluid pressure exerted in the passage 40 and upstream end of the member 43. This pressure responsive flow control device makes it unnecessary to adjust the rate of flow for each installation. The regenerating period is followed by a flushing period of suitable duration which is determined by the setting of the time control hand 70.

By operation of the pin 49 projecting from the valve 32 the spring-biased ball valve 50 is unseated so that during regeneration (the valve 52 being open) hard water is supplied to the service pipe 16 through the passage 58, chamber 57, passage 56, chambers 33 and 35 and passage 36, the check valve 34 being unseated by the upward pressure of the water. In any installation where it is desirable to supply hard water during regeneration, the valve 52 is merely left open. In other cases where the user does not wish to admit hard water to the service pipes, the valve 52 is merely closed and left closed. As shown, the stem 53 of this valve is provided with a cross bore 53a in which a pin may be inserted when the stem is to be turned to open or close the valve.

Regeneration followed by flushing continues while the time control hand 70 returns in a counter-clockwise direction. As this hand approaches its starting or zero position the latch 67 is released and retracted from engagement with the shoulder 68 thereby freeing the plunger 64 and valve rod 65 so that the spring 66 actuates the valve 32 to open position in relation to its seat 37 and to closed position relative to the opposite seat.

This cuts off flow to the drain pipe and reestablishes normal flow of soft water from the lower portion of the tank to the service pipe, as hereinbefore more fully described.

It will be evident that several permanent pipe connections for our improved valve casing are made directly with the unitary back casing member 11. These connections comprise the hard water pipe 15, service pipe 16, upper tank connection 17 and pipe 18 extending to the lower portion of the tank. In many installations a flexible hose may be used to advantage as the drain pipe 26 and such hose may be arranged to discharge into a laundry tub, sump or other waste outlet. For this reason the drain pipe port 26a is formed in the front casing member 12 where it is readily accessible to the user. All of the various valve mechanisms are carried by and readily removable from the front casing member 12 and this member is separable from the back casing member at the plane of the gasket 14 upon removal of the bolts 13. By this construction, installation of the controls is greatly facilitated and repair and replacement of the individual valve mechanisms is also facilitated.

Having described our inventon, what we clam as new and desire to protect by Letters Patent is:

In a control for a water softener having a tank and a valve casing formed with parts adapted to be connected respectively to the upper and lower portions of said tank, to a hard water supply pipe, a soft water service pipe and a drain pipe, the improvements which comprise, a first passage for the flow of soft water from one of said tank connected ports to said service port, a check valve disposed in said passage to guard against back flow of water from the service pipe, a branch of said passage disposed to by-pass hard water from said supply pipe to said service pipe, a second valve normally closing said branch passage, a second passage for the flow of liquid from said tank connected port to said drain pipe, a third valve controlling the flow to said service pipe and drain pipe through said first and second passages means operatively connecting said second valve to said third valve whereby said second valve is held in open position when said third valve is operative to close said first passage and open said second passage, a third passage extending from the other of said tank connected ports to said drain pipe, a fourth passage extending from said hard water supply pipe to said last mentioned tank connected port, a fourth valve disposed to control the flow through said third and fourth passages, a fifth passage for the flow of back wash water from said hard water supply pipe to said first mentioned tank connected port, and a fifth valve disposed in said fifth passage to open and close it.

References Cited in the file of this patent

UNITED STATES PATENTS

| | | |
|---|---|---|
| 1,676,532 | Dotterweich | July 10, 1928 |
| 1,929,405 | Bilde | Oct. 10, 1933 |
| 2,050,966 | Eisenhauer | Aug. 11, 1936 |
| 2,101,961 | Slidell | Dec. 14, 1937 |
| 2,504,816 | De Ville | Apr. 18, 1950 |
| 2,571,000 | Albertson | Oct. 9, 1951 |
| 2,607,728 | Albertson | Aug. 19, 1952 |
| 2,610,147 | Lindsay | Sept. 9, 1952 |
| 2,610,945 | Purcell et al. | Sept. 16, 1952 |
| 2,620,299 | Deters et al. | Dec. 2, 1952 |
| 2,673,182 | Hintz | Mar. 23, 1954 |